(12) United States Patent
Hartman

(10) Patent No.: US 8,938,921 B2
(45) Date of Patent: Jan. 27, 2015

(54) INTEGRATED SOLAR, DAYLIGHT AND NIGHT COOLING SYSTEM

(71) Applicant: Paul H. Hartman, Avon Lake, OH (US)

(72) Inventor: Paul H. Hartman, Avon Lake, OH (US)

(*) Notice: Subject to any disclaimer, the term of this patent is extended or adjusted under 35 U.S.C. 154(b) by 0 days.

(21) Appl. No.: 13/998,568

(22) Filed: Nov. 12, 2013

(65) Prior Publication Data

US 2014/0130426 A1    May 15, 2014

Related U.S. Application Data

(60) Provisional application No. 61/796,523, filed on Nov. 13, 2012.

(51) Int. Cl.
*E04C 2/52* (2006.01)
*E04F 13/08* (2006.01)
*F24J 2/46* (2006.01)

(52) U.S. Cl.
CPC . *E04C 2/525* (2013.01); *F24J 2/46* (2013.01); *Y02E 10/40* (2013.01); *Y02B 10/20* (2013.01)
USPC .......... 52/200; 52/173.3; 52/204.5; 52/302.1; 52/302.3; 454/199; 454/200; 454/221

(58) Field of Classification Search
USPC ............... 52/173.3, 200, 204.5, 302.1, 302.3, 52/473; 454/199, 200, 204, 205, 221, 900
See application file for complete search history.

(56) References Cited

U.S. PATENT DOCUMENTS

| | | | |
|---|---|---|---|
| 2,031,328 A * | 2/1936 | Mulford | 454/199 |
| 3,994,276 A | 11/1976 | Pulver | |
| 4,054,246 A | 10/1977 | Johnson | |
| 4,307,286 A * | 12/1981 | Guibert | 219/400 |
| 4,440,342 A * | 4/1984 | Flagg | 237/50 |
| 4,468,899 A | 9/1984 | Miller | |
| 4,577,619 A | 3/1986 | Howe | |
| 4,730,552 A | 3/1988 | Murray | |
| RE33,720 E | 10/1991 | Cummings | |
| 5,062,247 A | 11/1991 | Dittmer | |
| 5,134,827 A * | 8/1992 | Hartman | 52/584.1 |
| 5,435,780 A | 7/1995 | Ayles | |
| 5,617,682 A | 4/1997 | Christopher | |
| 5,953,869 A * | 9/1999 | Balfour et al. | 52/200 |

(Continued)

OTHER PUBLICATIONS

Huang, Commercial Heating & Cooling Loads Component Analysis, LBL#37208, Nov. 1999: Cover, Table 24 & Fig 17, Berkeley, CA.

(Continued)

*Primary Examiner* — Basil Katcheves
*Assistant Examiner* — Rodney Mintz

(57) ABSTRACT

Disclosed is a heat exchange conduit formed between pre-fabricated building panels and a daylighting section integral within pre-fabricated, structural panels. The daylighting section has the capability to take ceiling air (or air below free-standing arrays) and either return it to the building during heating months, reject the heat, or shunt it for other uses after being warmed through a dual pane glazing assembly with infrared rejection. During summer days, this allows for dramatic reduction in building cooling demand. Heat exchange surfaces within the conduit are thermally tied to the exterior components of the panels to allow heating by solar insolation or cooling to night sky or air. An advanced insulation system adds to thermal performance and sealed insulation cavities prevent moisture degradation of R-Values. Passage through the heat exchange conduit allows for active whole roof solar collection in spring/fall and night cooling capability during summer night operation.

14 Claims, 10 Drawing Sheets

(56) References Cited

U.S. PATENT DOCUMENTS

| | | | |
|---|---|---|---|
| 6,014,845 A | 1/2000 | Jain | |
| 6,142,645 A | 11/2000 | Han | |
| 6,630,622 B2* | 10/2003 | Konold | 136/246 |
| 6,695,692 B1 | 2/2004 | York | |
| 6,959,520 B2 | 11/2005 | Hartman | |
| 7,028,685 B1* | 4/2006 | Krecke | 126/633 |
| 7,954,281 B2 | 6/2011 | Jaster | |
| 8,068,282 B1 | 11/2011 | Kastner | |
| 8,122,666 B2* | 2/2012 | Gupta | 52/508 |
| 8,567,133 B2* | 10/2013 | Ahmed et al. | 52/173.3 |
| 8,701,362 B2* | 4/2014 | Stone | 52/200 |
| 8,726,586 B1* | 5/2014 | Stevens et al. | 52/173.1 |
| 8,813,460 B2* | 8/2014 | Cinnamon et al. | 52/747.1 |
| 8,824,051 B2* | 9/2014 | Thuot et al. | 359/596 |
| 2002/0112435 A1* | 8/2002 | Hartman | 52/648.1 |
| 2004/0123550 A1* | 7/2004 | Hartman | 52/720.1 |
| 2007/0151169 A1* | 7/2007 | Kandasamy | 52/79.1 |
| 2008/0263972 A1* | 10/2008 | Ramin et al. | 52/204.5 |
| 2011/0203196 A1* | 8/2011 | Lee et al. | 52/173.1 |
| 2012/0096781 A1* | 4/2012 | Romesburg | 52/173.3 |
| 2013/0091792 A1* | 4/2013 | Fujimoto | 52/302.1 |

OTHER PUBLICATIONS

Lee, Post-occupancy monitored evaluation of dimmable lighting, automated shading, & underfloor air distribution system in the NY Times Building, LBNL#6023, Jan. 2013.

Duffie, Solar Eng. of Thermal Processes, 2nd Edition, Wiley, New York, 1991, Fig. 2.6.

* cited by examiner

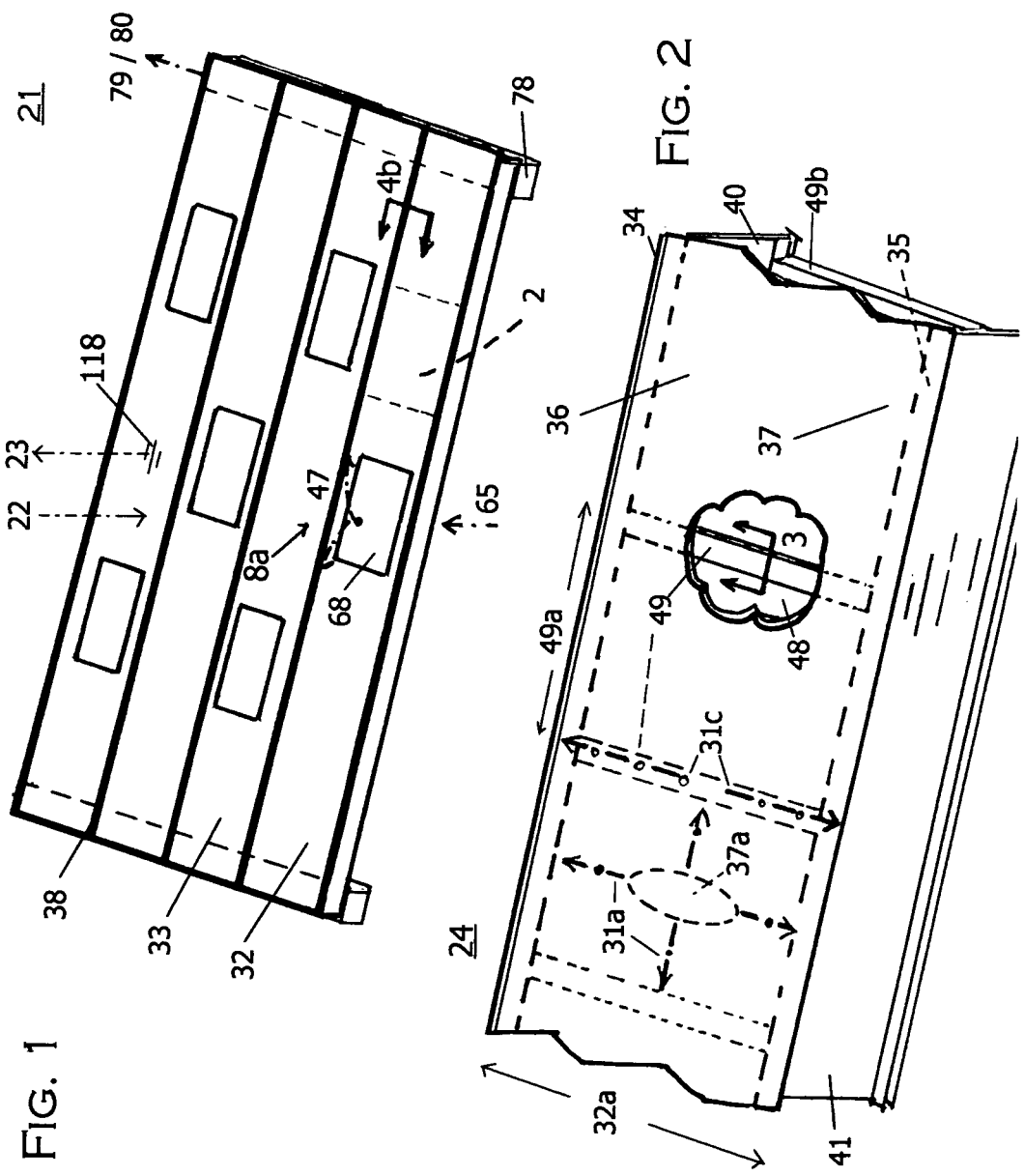

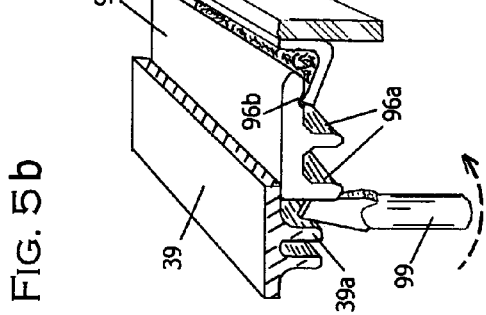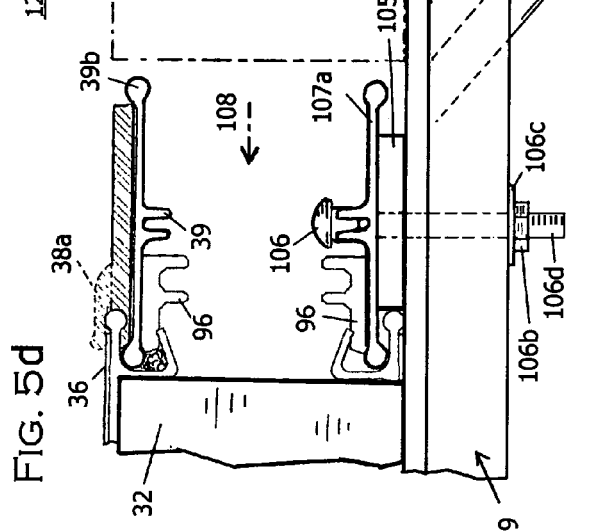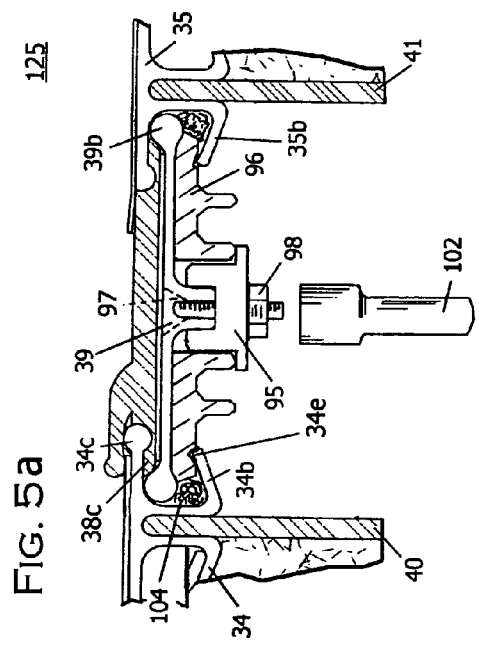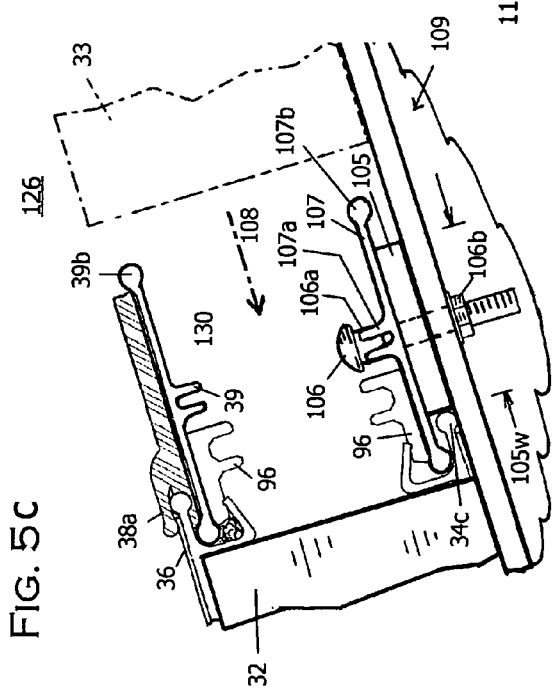

| 90 | Day | | Night | |
|---|---|---|---|---|
| | 94 | 61 | 94 | 61 |
| Summer | O | c | I | c |
| Winter | X | o | -- | -- |
| Fire | O | c | O | c |
| Spr/Fall | I | c | -- | -- |

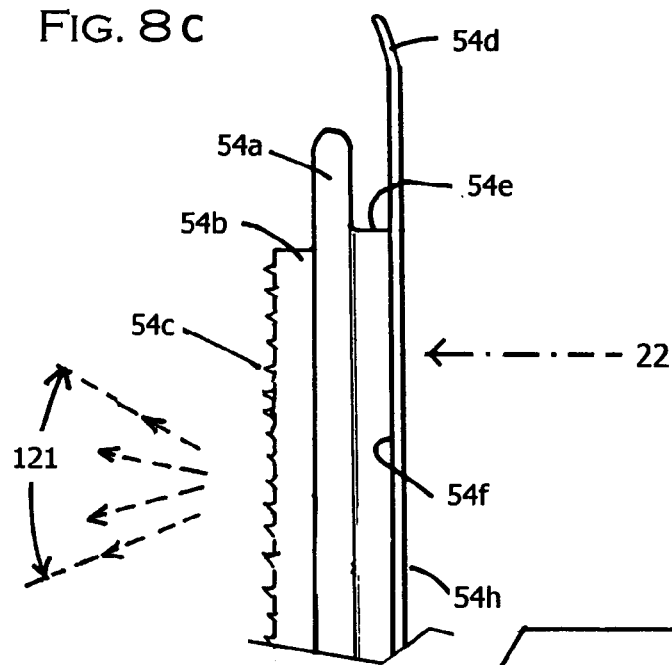
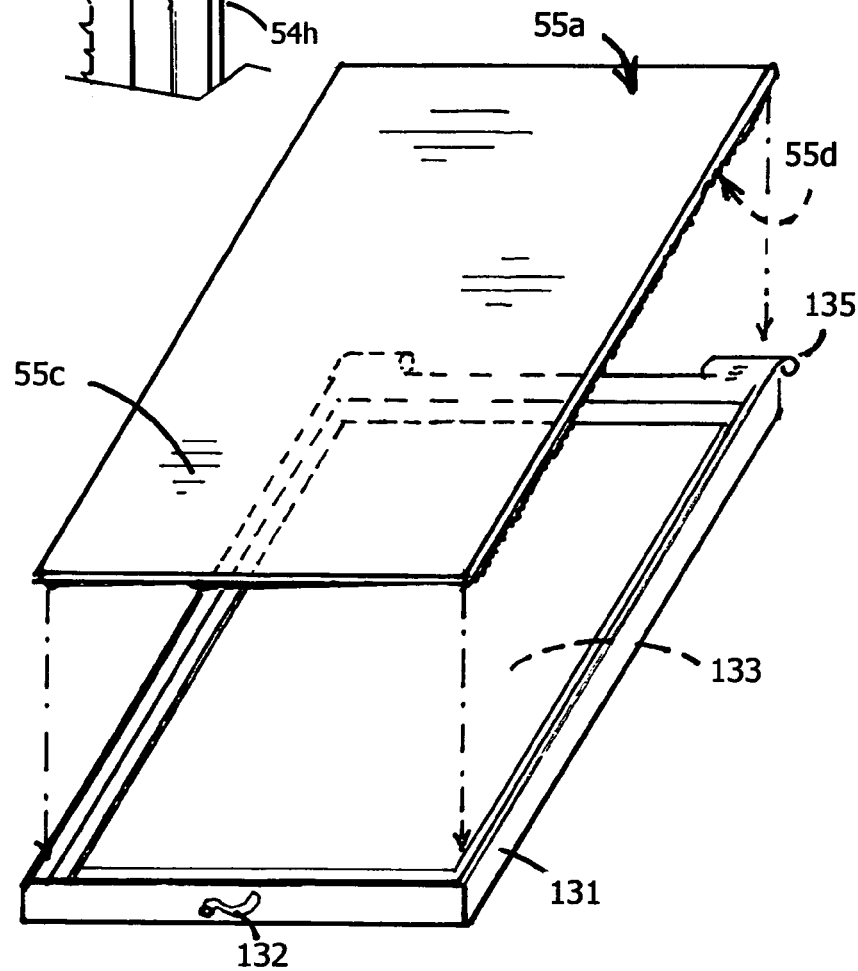

FIG. 10a  COOLING LOADS IN LARGE RETAIL,
PRIOR ART:  RESTAURANTS & SUPERMARKETS
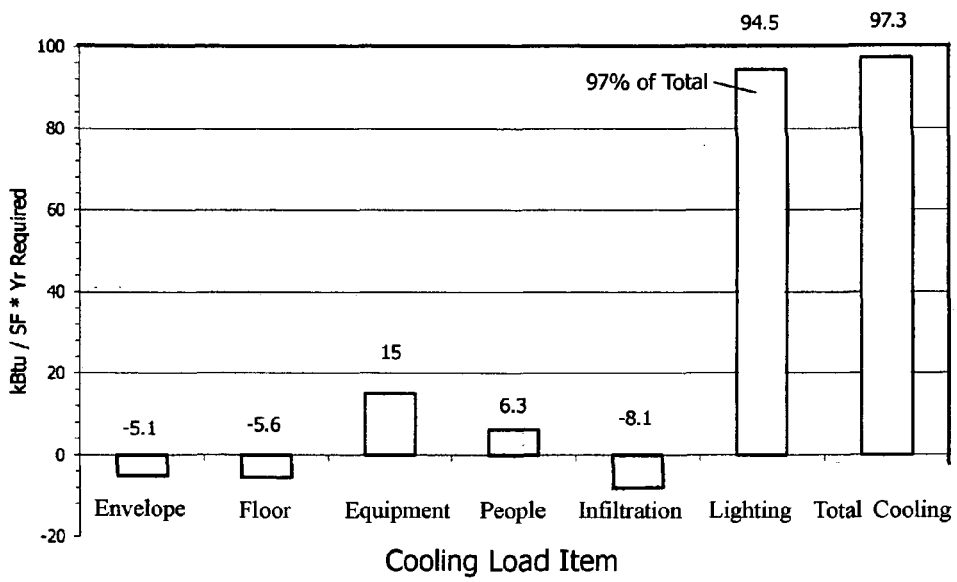
FIG. 10b  COOLING LOADS IN SM. RETAIL, FAST-
PRIOR ART:  FOODS & HOSPITALS
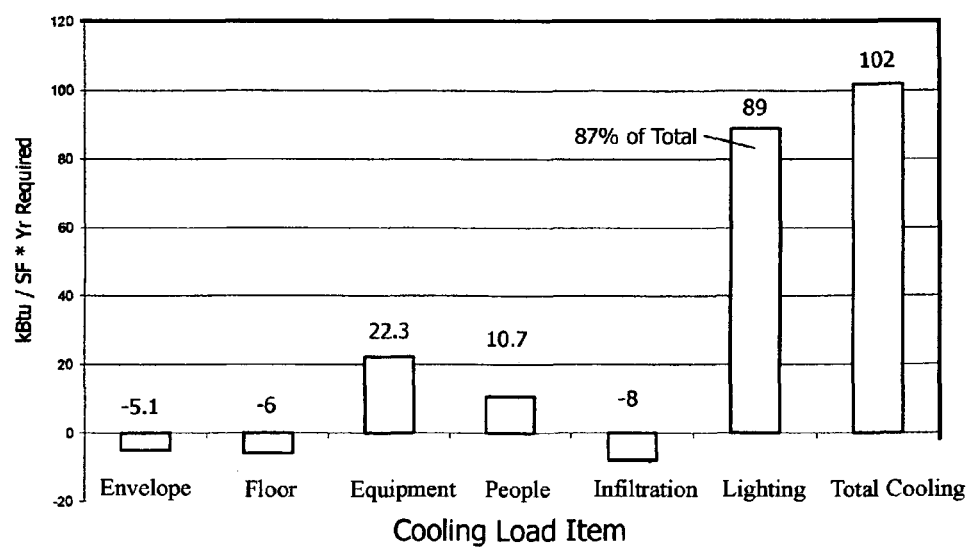
Both charts from Table 24, LBL Pub'n #37208, Commercial Heating & Cooling Loads Component Analysis, Huang et al, 1999
Lighting column includes both artificial lighting & solar gain from vertical glazing

INTEGRATED SOLAR, DAYLIGHT AND NIGHT COOLING SYSTEM

The following is a utility application by Paul H. Hartman for a system to improve heating and cooling performance in buildings converting provisional patent No. 61/796,523 filed on Nov. 13, 2012 under the title 'Daylighting and Night Cooling System'.

BACKGROUND

1. Field of the Invention

This invention relates to specifically to arrays of pre-fabricated structural panels to improve the efficacy of daylighting, heating, ventilation and air conditioning systems used in building operations.

2. Description of the Prior Art

Key metal building roofing improvements of in the areas of reducing moisture vapor permeation of through the roof deck, (to limit corrosion and maintain insulation values) and improving roof insulation, are not addressed in many current metal building roof decks. One area of the prior art in double roof plenum air source solar collectors such as Pulver (U.S. Pat. No. 3,994,276) and Johnson (U.S. Pat. No. 4,054,246) exacerbates these problems. While the roof deck amounts to about 23% of heating load in commercial buildings, the net effect is very small on the cooling load in commercial buildings (Huang 1999 and FIGS. 10a, 10b). Because of poor insulation in commercial roofing, typically R-9.9, the net effect of the roof deck on cooling load is negligible compared to other loads such as equipment (Lee 2013), lighting, and vertical glazing.

Cooling as a major peak summer load factor, along with daytime lighting can be seen as the major cause of grid failures/brownouts and is very important to a number of cooling intensive applications e.g. computer server centers, retail stores, offices, hospitals and supermarkets.

While Hartman (U.S. Pat. No. 6,959,520) effectively addresses the issues of improved insulation and vapor transmission/corrosion; the daylighting section there uses air flow between an upper and lower glazing for the primary purpose of removing heat buildup from that section i.e. not melting the thermoplastic upper glazing. Venetian blind louvers are used between the two glazing lites to modulate entry of both visible and infrared (IR) components of natural light entry into the building envelope. Either or both of these strategies/equipment approaches are used in the prior art of Murray (U.S. Pat. No. 4,730,552), Howe (U.S. Pat. No. 4,577,619), Cummings (RE 33,720) Dittmer (U.S. Pat. No. 5,062,247), Ayles (U.S. Pat. No. 5,435,780), Kastner (U.S. Pat. No. 8,068,282) and surprisingly the 2008 state of the art NY Times facility, (Lee, 2013). Miller (U.S. Pat. No. 4,468,899) and Christopher (U.S. Pat. No. 5,617,682) do not provide for movement of air between two parallel glazing components.

While the Times facility is not a systems or low-slope flat roof building, some important figures highlight the interactions between artificial/natural lighting, the advanced under floor air HVAC supply method and the cooling load. In a bar chart comparison to an ASHRAE 90.1-2001 compliant system, the new system showed very little reduction in cooling load, although the electrical lighting load was reduced to 56% of the control case. Daylighting influx of heat is the logical source of this equal cooling load as equipment demands are the same and waste heat from the artificial lighting has dropped.

Artificial and natural lighting make up between 87% and 97% of the total cooling load loads in commercial buildings with other factors such as the floor, building envelope, air infiltration, equipment and occupants being of a lower magnitude and acting to cancel each other out, FIGS. 10a/10b. In direct sunlight, only about 45% of the energy is in the visible part of the spectrum, while diffuse light (cloudier conditions, North light and winter) contains about 75% of the energy in the visible spectrum, (Duffle, 1991). The balance between shorter days during the heating season and increased visible content comes into play and moves daylighting performance toward a more equal footing (with the same roof daylighting aperture) between the seasons when IR filtering is used. Improved daylighting, heating and cooling systems for commercial structures should take these factors into account, ideally as integrated building envelope solutions.

In general, the double dome skylights commonly used to illuminate the interior of flat roof buildings do not filter the infrared component of exterior light. They therefore do not afford a significant improvement in air conditioning loading over artificial lighting. Double wall acrylic or polycarbonate plastic prior art leading to the present offerings includes examples such as York (U.S. Pat. No. 6,695,692). For this reason, daylighting codes, (where they are present), limit the percentage of daylighting aperture to 5% of the roof to prevent excessive cooling demand additions, [e.g. California Title 24]. California code recognizes the importance of daylighting in big box stores by requiring daylighting in any 'room' over 25,000 SF. It does not take into account IR filtering at present.

Several skylight systems using a roof mounted dome communicating through a reflective tube to a ceiling fixture, (primarily used in residential or low rise wooden construction) do have IR rejection built into the system. Representative prior art in this area is Jaster (U.S. Pat. No. 7,954,281). Parallel flat plate glazing of this type is represented by Dittmer (U.S. Pat. No. 5,062,247). Both these devices simply vent heated air flow to the exterior, rather than managing the use of the heat inside when it might be needed, again primarily using air flow to prevent melting of outer glazing. Jain (U.S. Pat. No. 6,014,845) uses an unusual diffract grating solution with only one (outer) glazing.

Other prior art that does not deal with infrared rejection but uses parallel room ventilation with separate glazing units is seen in York (U.S. Pat. No. 6,695,692) and Han (U.S. Pat. No. 6,142,645). In the mix of many very similar elements of prior art in the area of skylights and ventilating devices what is missing is a system focused on day to day and season to season heating and particularly cooling needs.

Daylighting curbs in the prior art are not often utilized for sloped roof building applications because of a difficult transition and sealing task between commonly used standing seam roof surfaces and the curbs. They are rarely used in retrofit applications for flat roofs as the sealing of the field cut hole for the device is another area of concern. Positive sealing of the glazing against the roof deck is therefore an important property for any improved daylighting/HVAC system.

Bringing some of the features of an improved system to bear on utilizing night sky cooling techniques, (Martin, 1984), the system could be utilized in a wide variety of buildings with high cooling needs, such as supermarkets and computer server facilities. This would also expand on the very early prior art of solar pioneer Harold Hay in this area.

Objects and Advantages of the Invention

Accordingly, several objects and advantages of the invention are:

a. An air source solar thermal/night sky cooling system for a roof deck that reduces the deleterious effects of moisture vapor permeation in use while improving roof insulation.
b. A daylighting system with infrared filtering that allows rejection of heat when desired and re-capture of heat for later and alternative uses when desired.
c. A system that integrates the use of night sky cooling and other off peak cooling capability with existing HVAC equipment, while not significantly adding to building cost.

Further objects and advantages of the invention will become apparent through consideration of the specifications and drawings:

SUMMARY OF THE INVENTION

The invention consists of an improved heat exchanging conduit formed between pre-fabricated building panels that is fed by a novel daylighting section integral with the panels. The daylighting section has the capability to take ceiling air (or air below free-standing arrays) and either return it to the building during heating months or shunt it for other uses after being warmed through a dual pane glazing assembly with infrared rejection.

Heat exchange surfaces at the interior of the conduit that are thermally tied to the exterior components of the panels allow transfer to or from the air flows passing through the conduit. This allows for whole roof solar collection in the spring/fall and night cooling capability during summer night operation. Both these operations return conditioned air to the building rather than depending on expensive thermal storage. Optionally, particularly in the case of free-standing arrays for cooling, storage can be used to augment the performance of a nearby HVAC system. Further aspects of the invention can be seen from the specifications.

BRIEF DESCRIPTION OF THE DRAWINGS

FIG. 1 is an isometric drawing of a panel array for roofing or other structural uses.

FIG. 2 is a cut away, detail drawing of a panel illustrating features of a thermal plane

FIGS. 5a and 5b are field assembly illustrations of the upper part of the thermal conduit.

FIGS. 5c and 5d are assembly illustrations of structural connections to systems and flat roof buildings.

FIG. 6a is an isometric assembly drawing of a daylighting section including components and settings.

FIG. 6b is an operational listing of typical seasonal and daily settings accompanying FIG. 6a.

FIG. 8c is an edge view of the outside glazing FIG. 9 is an isometric of an alternate interior glazing including a lower carrier frame for glazing FIGS. 10a and 10b are comparative performance charts of the prior art based on LBL Pub'n 37208

DETAILED DESCRIPTION

Figure 3:
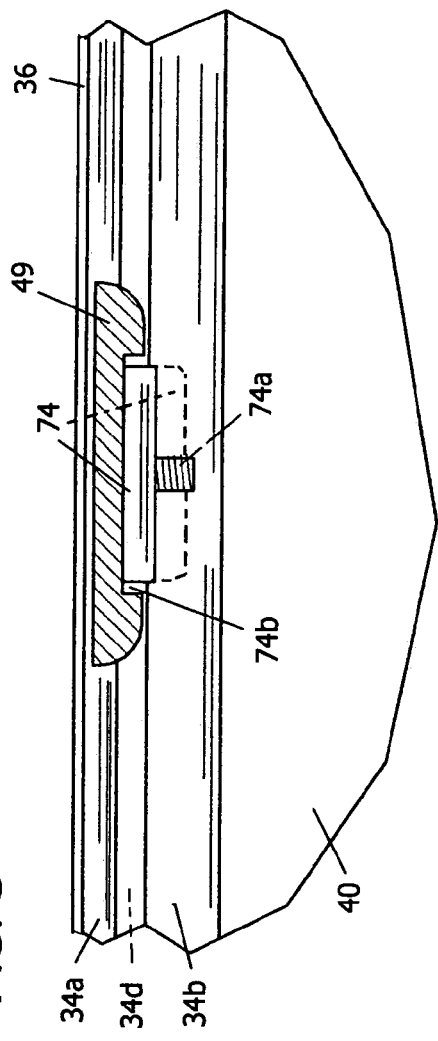
FIG. 3 is a detail section through a cross brace viewed from within the panel of FIG. 2.

1. FIGS. 1 through 7 show the structure and function of a thermal plane 24 at the exterior of a panel array 21 that can transmit heat to and from a conduit assembly 30 for the purpose of reducing the heating and cooling demands of a building.

2. FIGS. 6a through 9b show the structure and function of an integral daylighting section 68 in: 1) Cutting the infrared (IR) heat content of solar insolation 22 before it enters a building, 2) Removing heat arising from artificial lighting and equipment within the building during peak electrical and air conditioning periods, 3) Drastically reducing the artificial lighting demand of a building during peak summer usage periods, 4) Utilizing the night cooling capabilities of thermal plane 24 to provide off-peak cooling of a building, and 5) Providing for enhanced fire and violent storm resistance.

3. FIG. 1 shows a panel array 21 utilizing the invention where specific panels 32 and 33 are tied structurally to frame components (FIGS. 5c and 5d) and one another (FIGS. 4b through 5b) to form conduit assembly 30. Solar insolation is illustrated by arrow 22. Night cooling losses from the array 21 through convective and radiative heat transfer are illustrated by arrow 23. Panel surfaces preferably comprise a highly emissive coating 118, commonly made using PVDF polymer, which facilitates night sky cooling by radiation to the night sky.

4. Conduit assemblies 30 are formed between individual panels such as 32 and 33 (FIG. 4b) and transmit air flows 47 arising from daylighting sections 68 to plenums 78. In turn, one or more louvers 94 can vent flows outside 79 the building envelope 91 or return thermally modified air flows 80 to inside the building envelope. (See FIG. 7) Air flows into the daylighting sections, arrow 65, are supplied from below panel array 21. Inter-panel joints have a weatherstrip seal 38 affixed between them which is shown in FIGS. 1, 4a, 4b and 5a to 5d.

Figure 7:
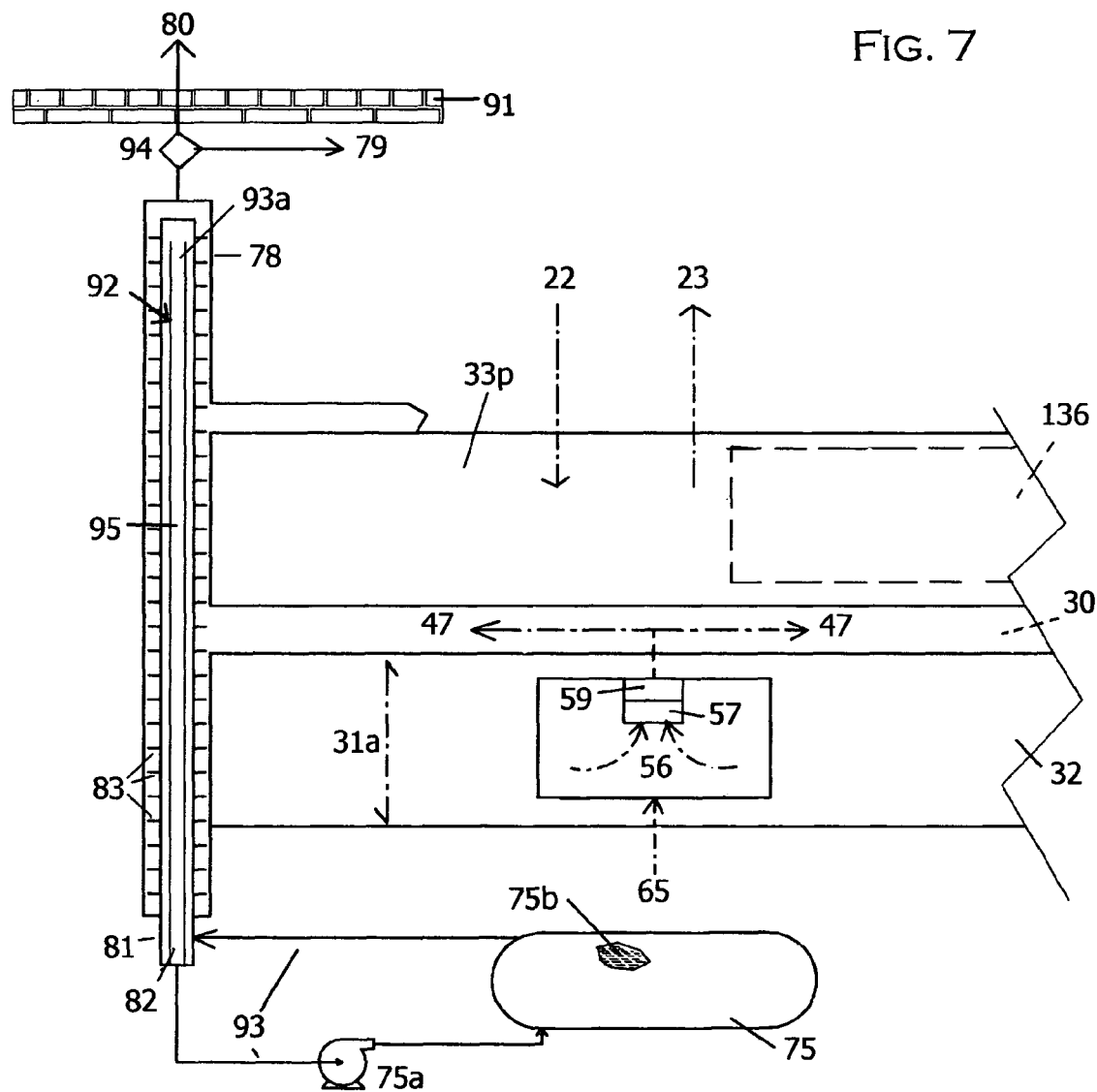
FIG. 7 is a process flow drawing of the overall daylighting and night cooling system

5. The panel array 21 can comprise the roof of a systems (sloped roof) metal building as shown in FIG. 5c. It can be attached to truss beams 119 of a flat roof metal building (with a slight pitch for drainage) as shown in FIG. 5d. It can also be utilized with residential, small office or pole barn wooden construction (not shown) or used as a free-standing energy structure (as indicated in FIG. 7) in parking lots or atop existing flat roofing.

6. The area indicated by dashed lines 2 in FIG. 1 is expanded in FIG. 2 to illustrate the operating components and principles of the invention within panel 32 and the formation of thermal plane 24. Cross braces 49 tie an up-slope flange 34 and a down-slope flange 35 together both mechanically and thermally, as they are preferably made from aluminum extrusions. Exterior skin layer 36/37 is bonded to the flanges at the dotted areas and completes thermal plane 24.

Figure 4A:
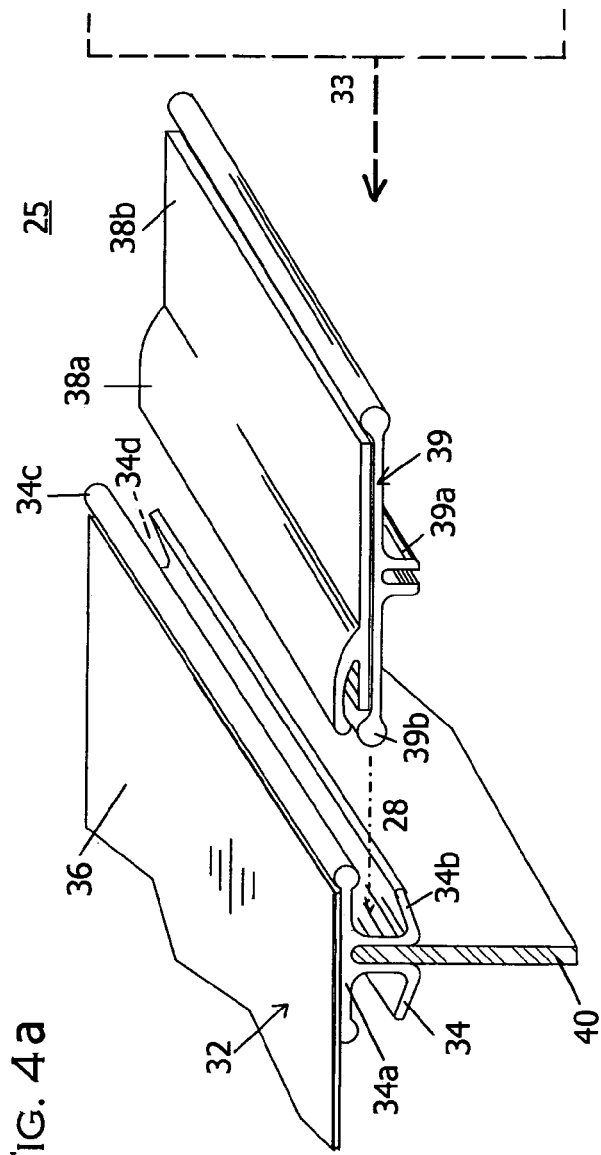
FIG. 4a is an initial assembly drawing for an inter-panel joint assembly.
Figure 4B:
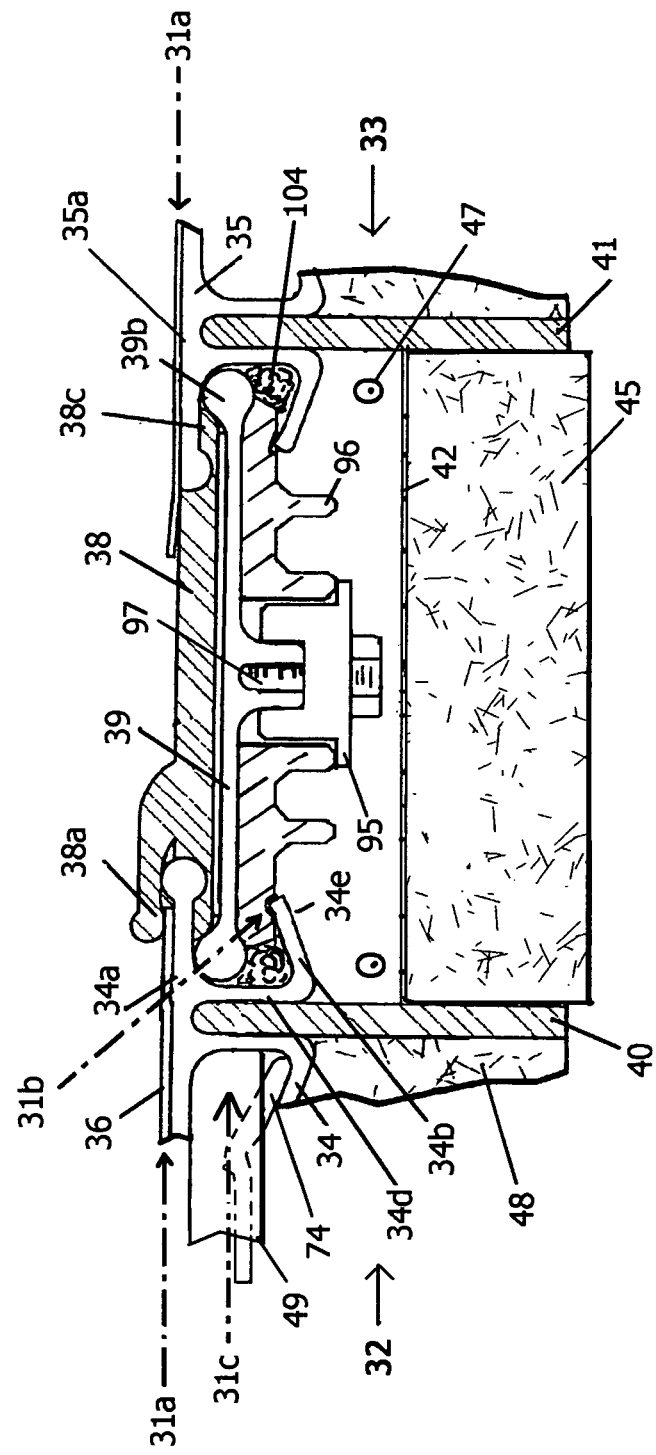
FIG. 4b is a cross section of the thermal conduit formed between panels 32 and 33 of FIG. 1.

7. The strong mechanical tie provided by the cross braces also improves resistance to racking distortion in the panels. As shown in FIGS. 3 and 4b, cam levers 74 are secured by screws 74a within the slots 74b at the lower surfaces of the cross braces. As shown in FIG. 4b the action of levers 74 against flange angles 34b during assembly of the panel frame, (not numbered) acts to urge the shaped end of braces 49 against the interior surfaces of flange 34, improving heat transfer represented by arrow 31c.

8. Composite web portions 40/41 and insulation layer 48 thermally isolate exterior skin 36/37 and thermally conducting flanges 34/35 from the lower flanges (not numbered) and interior skin layer 66 (see FIG. 6c). Insulation values exceeding R-40 were achieved in bench testing of a 4 inch thick panel made with compressed conventional fiberglass having special processing used as layer 48. The present commercial building stock in the country has only R-10 roof insulation. Ashrae 90.1 requires R-30 for systems buildings in most areas of the country.

9. Web portions 40 and 41 are preferentially made from phenolic resin/fiberglass fabric composites having UL (fire) and NEMA (electrical) ratings. As all of the components in the panels are fire resistant, panels 32 and 33 are intrinsically fire resistant. Considering also the insulating properties discussed above, use in fire prone areas such as parts of the western U.S. could be helpful in reducing damage to property and life loss.

10. The combination of composite webs, (0.125" thick), and aluminum flanges results in strong structural characteristics for the panels. In deflection testing similar to ASTM E72, it was found that 4" thick by 20" wide panels had a projected deflection of only 1/240 L/d for a uniform load of 35 pounds/SF over a span of 14.5 feet. This is a typical load requirement for most areas of the U.S.

11. The spacing between cross braces 49a relative to the thickness of exterior skin 36/37 and the width of the panel 32a is chosen to optimize heat transfer 31a through skin 36/37 while attempting to minimize the material costs of the panel. An initial estimate of a usable ratio between dimensions 49a and 32a is 1 to 1.5. The central area 37a between these structural/major heat transfer components transmits heat through exterior skin 36/37 as indicated by dash dot arrows 31a.

12. Skin area 36 directly transfers heat to or from flange 34 through a significant overlap area (dotted line on the up-slope side) and skin area 37 directly transfers heat to or from flange 35 through a significant overlap area there. (See 34a and 35a in FIG. 4b) Heat readily transferred from area 37a to cross braces 49, is transferred through the larger cross section of the braces, (See FIGS. 3 and 4b)) to the flanges as indicated by dash dot arrows 31c.

13. FIG. 4b is a cross section of the completed conduit assembly 30 showing components enclosing a channel 46. Dense fiberglass duct board type insulation 45 is field installed from the inside of the building to snugly fit between composite webs 40 and 41 in the inter-panel space. It preferably has a foil-scrim-kraft, (FSK) laminate 42 on the side facing the channel. The FSK laminate both provides a radiant barrier to reflect heat towards the upper part of the conduit assembly and an aerodynamically rough surface to enhance turbulence in air flow 47, thus improving convective heat exchange. It is commercially available from CertainTeed, Owens Corning and others in 1" thickness.

14. Composite web sections 40 and 41 form the left and right sides of channel 46. The upper surface of the channel provides the capability to selectively add or remove heat from air flows 47 based on heat flows, arrows 31a, 31b and 31c, arising from thermal plane 24. The upper surface of channel 46 is formed from angle portions 34b of flanges 34 and 35, clips 96 that secure top plate 39 against the flanges, portions of top plate 39 and periodically spaced brackets 95 that prevent clips 96 from moving out of position once secured as shown in FIGS. 5a and 5b.

15. All the upper surface components are preferably made from 6063 T5 alloy aluminum extrusions for low cost, light weight and good thermal conductivity. The large extended (wetted) surface at the upper part of the conduit and short distance between laminate 42 and clips 96 serves to decrease the hydraulic radius and increase the velocity of air flows 47 within channel 46, thus increasing the heat transfer coefficient between conduit 30 and air flow 47.

16. A key factor in the heat flow indicated by arrow 31b is a good congruence/contact between bulbs 39b at the edges of plate 39 and the internal radius (not numbered) of flanges 34 and 35. Optionally, thermal caulk 104 can also improve heat transfer to conduit 30 from thermal plane 24.

17. The thermal plane at the lower part of the panels, illustrated by cross brace 49b and interior skin 66 (FIG. 6c) is thus well insulated from the exterior thermal plane 24 comprising cross braces 49, skin layer 36/37 and flanges 34/35. As many of the components of panels 32/33 are present in conventional roof decks, but configured differently with appropriate materials in the present invention, this can be achieved at a relatively low cost increment compared to standard construction methods.

18. FIGS. 4a through 5d show the sequence of assembly of the panels to one another and to structural members such as I beam girders 109 and truss joists 119. FIG. 4b is the completed weatherstrip assembly 25 and structural assembly. In contrast to five passes across the roof deck from the outside common for assembling conventional (stick built) systems buildings, the new system can be assembled as shown in FIGS. 5a-5d by workers operating off of a scissors lift from inside the building in two passes across the roof deck. In contrast to driving self-drilling screws through insulation foam into corrugated metal from the outside for flat roof buildings; the roof membrane is not perforated with the new system. The later change has important implications for better fire resistance by eliminating paths for liquefied foam materials to contribute to a fire under 'flashover' conditions.

19. FIG. 4a shows the first step in the assembly sequence of attaching panel 33 to panel 32 in the creation of panel array 21. Top plate 39 is moved into dovetail shaped channel 34d as shown by arrow 28. Plate 39 has a notched ridge 39a at the bottom and bulb portions 39b at both edges. Weatherstrip seal 38 has a flat portion 38b extending between the bulbs and a flap portion 38a at what will become the down-slope side of the joint. Seal 38 is preferably made from a closed cell, fire resistant foam with high compression recovery such as Neoprene™. As plate 39 moves into channel 34d, it clears flange bulb 34c above and stops when it arrives at the back surface of channel 34d. Flat portion 38b is slightly compressed between bulb 34c and angle portion 34b of flange 34 at this point.

20. Moving to FIGS. 5a through 5d; clips 96 are inserted between the lower surface of plate 39 at the down-slope side of joint being formed and temporarily locked in place using a screw driver 99 with a twisting motion of the blade between notched ridge 39a and projection 96a of the clips. When the shallow notch 96b reaches the corner 34e of angle portion 34b it will click into place. Clip 96 will compress flat portion 38b of seal 38 below flange bulb 34c and above plate bulb 39b to form the primary seal of assembly 25. FIG. 5a illustrates completed weatherstrip assembly 125. FIG. 5b illustrates assembly method for clips 96 within the invention. FIG. 5c illustrates structural connection 126 to a sloped roof building girder. FIG. 5d illustrates structural connection 124 to a low slope (flat roof) structural truss joist.

21. The area of former flat portion 38b between these two points is indicated by 38c in FIG. 4b and resembles in some ways a compressed o-ring in a circular seal. Flap portion 38a comprises the secondary weather strip seal in the case of systems buildings or other sloped roof assemblies. It has not yet been determined if flap portion 38a should be used in the case of low pitch flat roof assemblies or if other secondary sealing means should be used. As shown if FIG. 5d, panels are oriented perpendicular to truss joists 119 when used in low slope (flat roof) buildings. A pitch of up to 2 inches per foot of run should preferably be used in conjunction with these types of installations.

22. The temporarily locked exterior components and the structural ties to girders and trusses are established as shown in FIGS. 5c and 5d before lifting, placing and engagement of panel 33. A shortened section of plate material 39, indicated by 107b or 107a is welded to a spacers 105 or 105a and mounted to a girder 109 or a truss joist 119. Shorter carriage bolts 106a rest in a gap of notched ridge 107a, pass through spacer plate 105 and the upper flange of girder 109 (opposite side of upper flange not shown but used) and are loosely secured with nuts 106b below the top flange. As with top plate 39, section 107b is temporarily held parallel to the girder flanges by a clip 96.

23. The width of the spacers, 105w, determines the spacing between panels 32 and 33. Panel 33 is then lifted up to the roof deck and moved in place, as indicated by arrows 108. After positioning the new panel, clips 96 are place on the up-slope side of the joint and brackets 95 secured to studs 97 with nuts 98 to secure assembly 25. The free ends of the clips cannot move downward loosening the contact/seal at area 38c. When position into and out of the plane of the drawings is confirmed, bolts 106a or longer bolts 106d are tightened, locking the panels to building frame components.

24. Instructions relating to FIG. 5c apply to FIG. 5d with the exception that longer carriage bolt 5d is threaded between the upper angle iron parts 119a and 119b of truss joist 119 and a nut 106b and fender washer 106c are used to secure the panels. Part 123 is a diagonal brace in truss joist 119. Without perforating the panels with self-drilling screws the panels can be easily removed and re-used/modified or replaced with alternates. The modular nature, light weight and expandability of the panels from a shipped container like configuration make it ideal for use in refugee or disaster relief around the world. It is also suited for developing country use for village buildings to counter the rising problem of migration to urban slums.

Figures 6A, 6B:
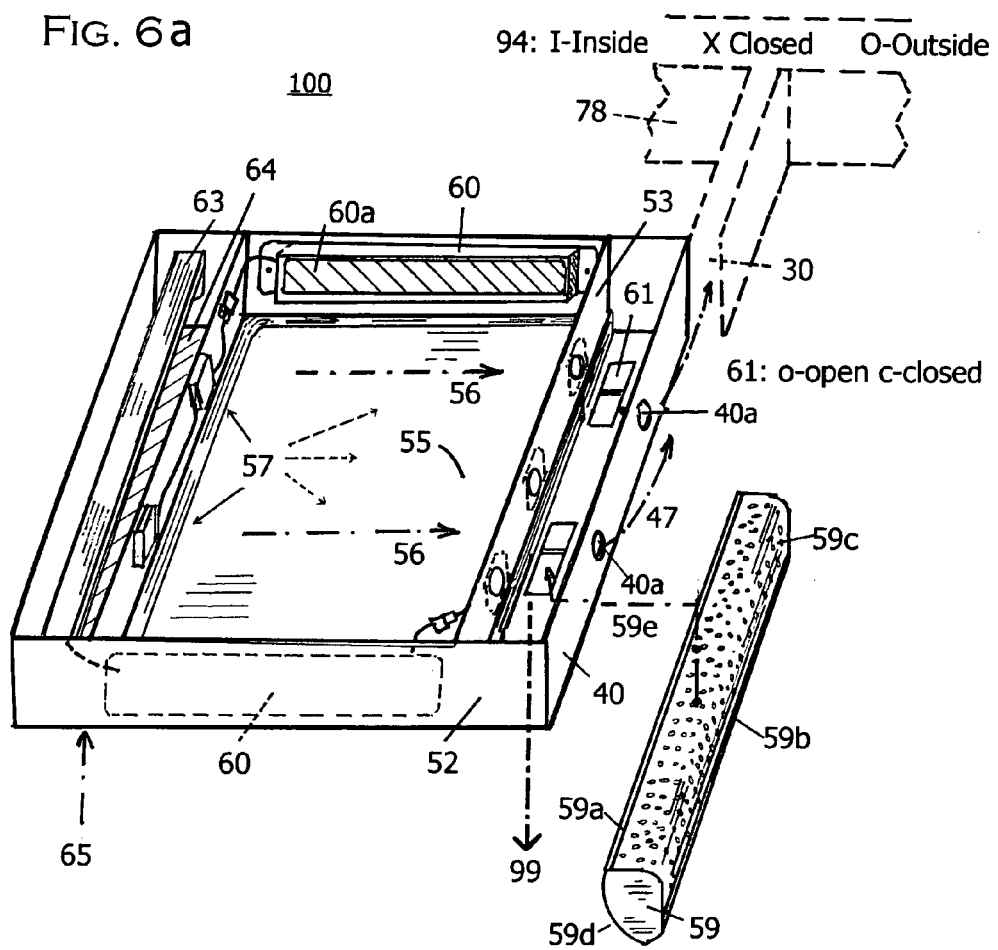
Figure 6C:
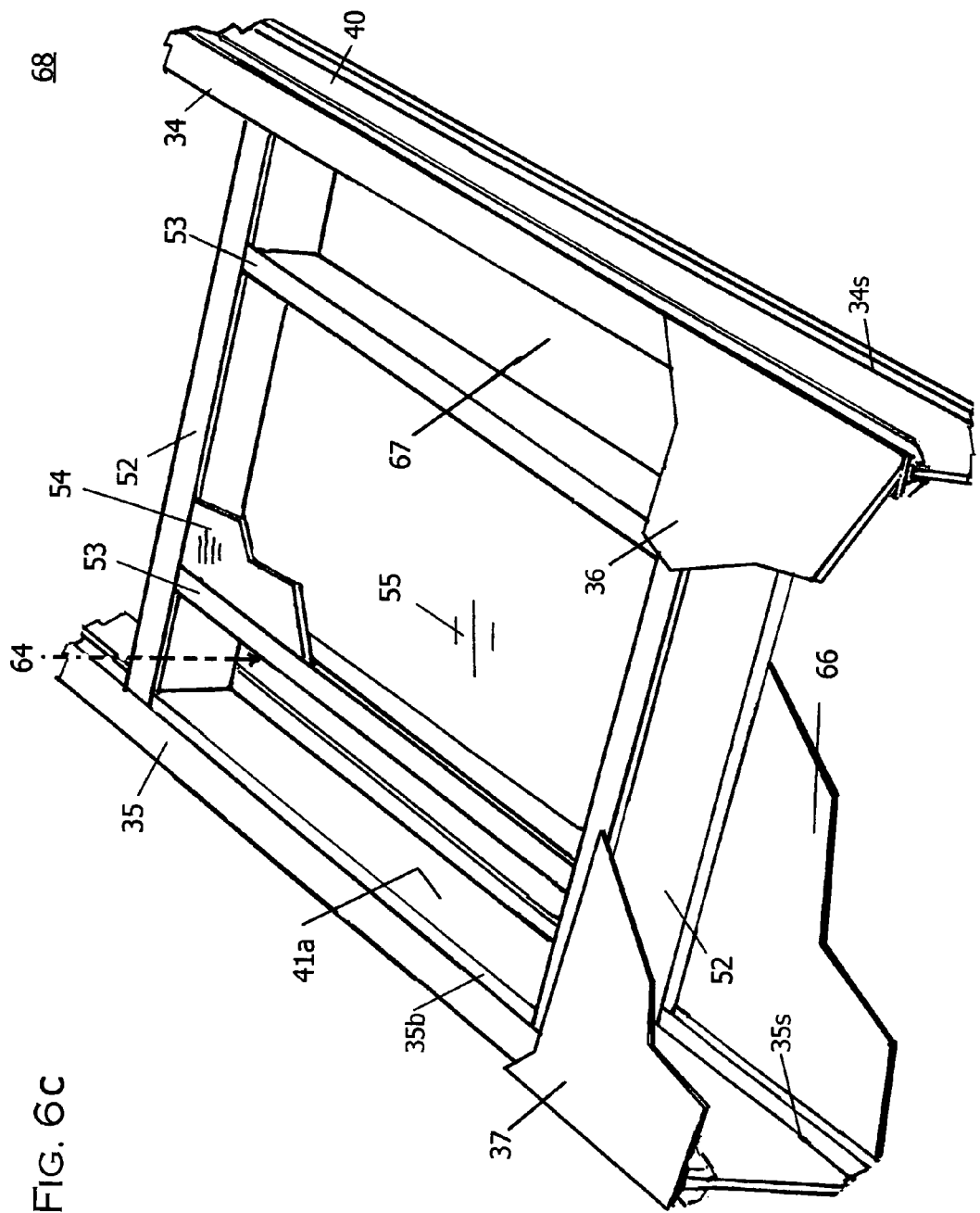
FIG. 6c is an isometric drawing of the basic structure of the same daylighting section
Figure 8A:
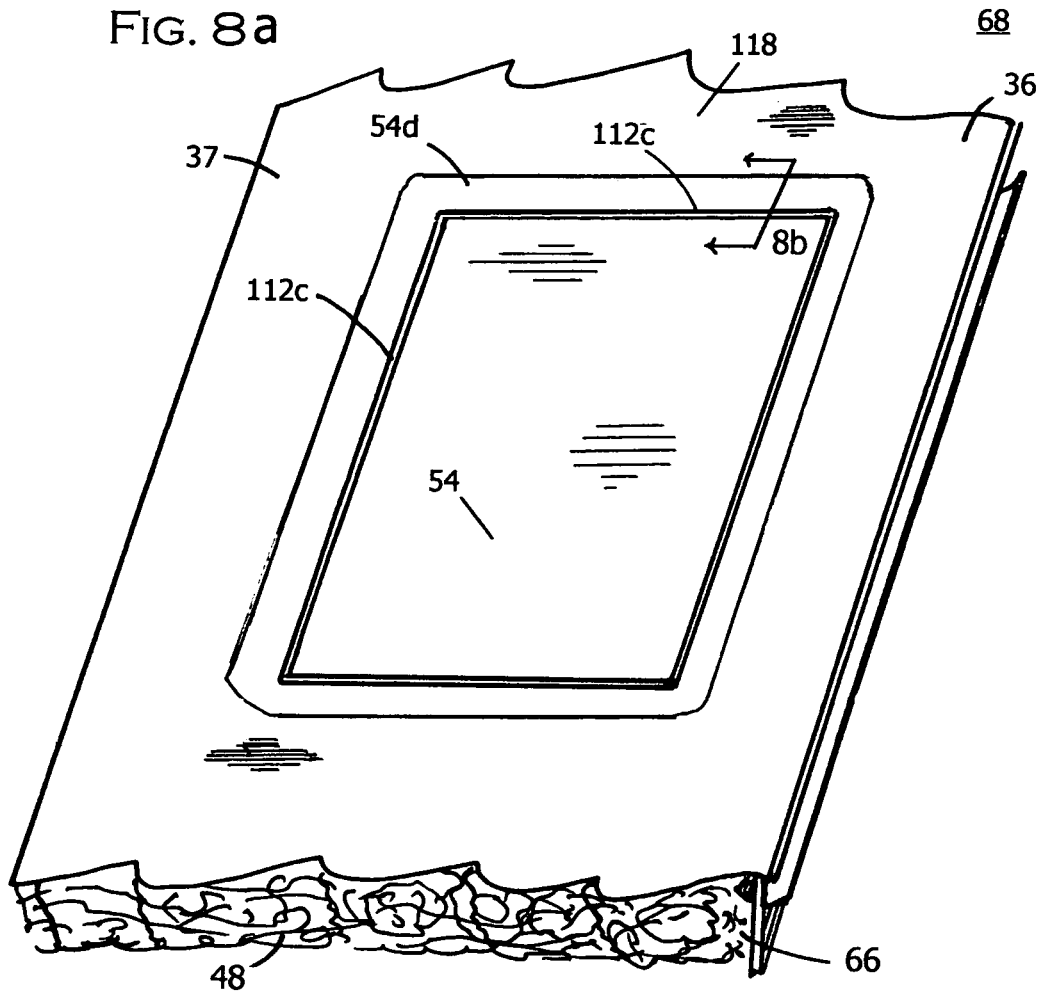
FIG. 8a is a top view of a daylighting section as indicated in FIG. 1.
Figure 8B:
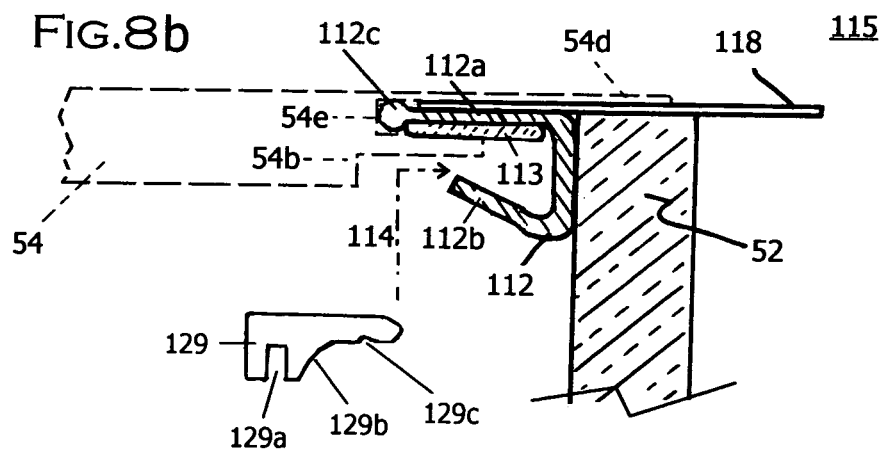
FIG. 8b is an assembly drawing of the connection between outside glazing and a bulkhead

25. FIG. 6c is a cut-away structural isometric of a daylighting section 68 within a roof mounted panel, such as panel 32 or panel 33. Bulkhead assemblies 52 delineate the area of the section along the long axis of the panels and are locked into the angle I beam side rails of the panel 34s and 35s. (Reference U.S. Pat. No. 6,959,520 for Demand Side Management Structures) Stringer sections 53 are anchored to and span the bulkhead assemblies dividing the daylighting section into three compartments. The view is from the exterior of the roof deck and the exterior skin 36/37 is cut away to reveal the structure. Exterior skin 36/37 in the completed panel covers the entire exterior surface (viewed from the outside) up to the perimeter of exterior glazing 54. The preferred material for glazing 54 is ¼" thick acrylic plastic. FIG. 8b provides additional details on surface options.

26. One key feature of the invention is the use of an exterior glazing at the center compartment in conjunction with an interior pane 55 shown below it in this view. During development work it was found that the IR content of ambient day light passing through the assembly as shown could be cut from 50+% at the exterior to 8-14% infrared in the total light entering the building space below. This greatly reduces the air conditioning load of a building as the vast majority of this load comes from artificial lighting and vertical glazing as shown in FIGS. 10a and 10b. In turn, artificial lighting and air conditioning load during summer days, (when daylighting can be used) are the straw that breaks the electric grids' back. This is occasionally referred to as 'the energy crisis'.

27. Two preferred materials for interior pane 55 are 1" double lite units of PPG Solarban™ 70XL on Starphire (clear) combined with another lite of Starphire in the first case and a second lite of Atlantica (tinted) 0.25" thick glass in the second case. There was 0.5" between the two panes. Atlantica resulted in only 8% IR entering the building envelope while the Starphire resulted in about 14% entering the building. Potent visual evidence supporting this heat rejection was provided by the bright red color emerging from the edges of pane 55 during the day.

28. Both double pane units had R values of 3.4, which combined with rejection of IR content and removal of warm air flow 65 from the ceiling of the building amount to an extremely significant amount of air conditioning reduction. As detailed in FIGS. 6a and 6b, the routing and management of air flow 65 across interior pane 55 and conditioning through thermal conduit 30 are two powerful tools for resolving some of 'the energy crisis'.

29. FIG. 6a shows functional components applied to the structure shown in FIG. 6c. FIGS. 6a and 6b together provide a controls 90 and operation logic sequence for the solar, daylighting and night cooling system 100 of the invention. Two small blowers 57 are mounted on the left stringer section 53 in the view. Three small blowers, indicated by dashed arrows from character 57 are located on the right stringer section 53 in the view.

30. The area indicated at bottom of the left compartment, 64, is open to the area below the array to allow air flow 65 from below array 21 to readily enter daylighting section 68. After moving past lighting strip 63 in the left compartment, the pair of two blowers moves this air flow (arrows 56) across the surface of interior pane 55. During daytime operations, IR sourced heat rejected by pane 55 is picked up by the flow and moved towards the three blowers on the right.

31. Normal stratification in the building will allow much of the heat generated inside building envelope 91 by equipment, other artificial lighting and even the heat generated by the visible light allowed to enter the building to be taken up along with air flow 65.

32. A module 60 containing battery storage, controls electronics and power supplies supplies power through the connector (not numbered) at the far left of the view to the two blowers at left. It is mounted on far bulkhead 52. A near module 60 indicated behind near bulkhead 52 supplies power to the three blowers at the right.

33. Photovoltaic (PV) strips 60a mounted at the interior surfaces of both modules both quantify the amount of natural light available (for switching and control purposes) and supply DC power to the batteries for night operations. Lighting strip 63 is preferably an LED device and can be sourced either from modules 60 and/or ordinary grid supplied AC power. Blowers 57 can be conventional electronic units designed for the higher heats expected to be encountered in the central compartment.

34. Drying agent cartridge 59 is shown at right and installed per dash dot arrow 59e in the right compartment of daylighting section 68. It has a semi-circular face 59d which faces the three blowers mounted on right stringer 53. Two gasket strips 59a and 59b separate face 59d from a roughly right angle surface 59b which faces web portion 40 with two holes (not numbered) connecting the right compartment with conduit assembly 30.

35. Cartridge 59 contains a packed bed of drying agent 58 having the characteristic of dehydrating in a flow of warmer air and absorbing moisture from a cooler stream of air. This is desirable to prevent condensation of moisture in air flow 47 during night cooling operation and formation of mold within conduit assembly 30. Surfaces 59d and 59b of the cartridge are made from perforated metal or high temperature plastic sheet. Gasket strip 59a meets upper skin 36 at the top. Gasket strip 59b meets web 40 requiring passage of air flow 56 through cartridge 59 and out through holes 40a into channel 46.

36. Lower plate 67, (FIG. 6c) contains movable gates 61 which are part of the overall control scheme (FIG. 6b) and is hinged (not shown) for the normal installation of cartridge 59 from below. Positions of gates 61 are 'o' for open and 'c' for closed. These are enabled by an actuator, (not shown). The second element of the control scheme, louver(s) 94 in FIG. 7, are characterized by the dashed illustration of assembly 30 and plenum 78 at the upper right of FIG. 6a.

37. Positions for louver(s) 94 are 'I' for directing flow 47 to the inside of the structure, (shown as '79' in FIGS. 1 and 7), 'O' for directing flow 47 to outside the structure, (shown as '80' in FIGS. 1 and 7) and 'X' for blocking flow through plenum 78 to enable bypass through open gates 61. The 'X' position creates a return flow 99 to the building interior originating at semi-circular face 59d. Ideally the lower edges of gates 61, (not shown) are designed to disrupt some stratification within building envelope 91 using return flow 99, much like a ceiling fan.

38. A control logic chart for the operation of solar, daylighting and night cooling system 100 is shown in FIG. 6b. While the invention is not limited to this control scheme, it represents a reasonable approach to utilizing the system components in a large number of ordinary applications.

39. Two control settings/operational modes that are central to functionality of system 100 are: Summer-Day and Winter-Day. In the Summer-Day mode: Interior air flow 65 below panel array 21 carries excess heat from the interior of the building past lighting strip 63 which should be off during peak cooling hours of the summer. Passing over pane 55 moved by fans 57 significant amounts of heat energy arising from IR rejection and some visible light absorption by the pane are gained. This amounts to roughly 53% of the light wattage entering below upper pane 54 in the case of the two lite Starphire™ pane cited above. Roughly 40% of this wattage reaches the interior of the building as visible light. As gates 61 are closed, air flow 47 moves through cartridge 59, conduit assembly 30 and is vented to the outside, (louvers 94 set at 'O').

40. In the heating season, solar insolation 22 is very roughly 40% of summer values on a daily basis through a typical November to March heating season. A very rough estimate of the visible light content of insolation 22 shows that it could go up to 79% from the 44 to 47% encountered during cooling months due to a higher proportion of diffuse light in the mix.

41. In the Winter-Day mode of operation: Air flow 65 from just below the ceiling carries artificial lighting heat and equipment heat up past lighting strip 63 which may be partially on, contributing heat to the flow depending on the measurements at PV strips 60a. Due to the higher proportion of visible light coming in and the shorter daytime use hours, the amount of visible light entering building envelope 91 will stay about the same. About 42% of solar insolation 22 rejected by pane 55 will be returned by means of fans 57 to within the building via air flow 99 below open gates 61. Contributions made from lighting strip 63 and heat sourced within the building are returned as well. Louvers 94 are in the 'X' closed position enabling this flow. Both the improved insulation of the panels discussed earlier and this return of heat to within the building should provide for a significant reduction of heating demand.

42. Radiative night sky cooling during the summer can contribute between 250 and 600 W hr of heat sink capacity per night per meter squared of panel array 21 surface to an HVAC system or other refrigeration system within a building. This range does not consider contributions from convective cooling and is arrived at looking at climate data from 30 cities scattered across the country. The Summer-Night mode of operation of system 100 would therefore be important to a number of buildings with high cooling needs such as data centers, hospitals, or supermarkets.

43. In the Summer-Night mode, operating in early morning hours for best effect, air flow 65 from inside the building passes light strip 63 which is typically off. Little effect occurs passing across the top of pane 55 and blowers 57 force the air through drying agent 58 which has been dehydrated from warmer air passing through during the day. Dry air flow 47 passes through thermal conduit 30 and cools due to heat flows 31a, 31b and 31c toward thermal plane 24. Cooled dry air returns through flow 80 to the interior of the building as louvers 94 are set to the 'I' interior positions.

44. While the description above is for an integral roof mounted array/plenum, a similar mode of operation is possible for potential free-standing arrays described at FIG. 7. The same cooling intensive applications described above could also be served by system 100 configured in parking lot arrays or over-roof arrays mounted on top of existing roofing.

45. In a fire or other extreme weather condition such as a hurricane, it is desirable to vent the air at the interior of the building as much as possible. This removes smoke from the building in the first case and reduces the pressure in the building in the second case, limiting uplift forces on the roof. In the Fire mode, louvers 94 are in the 'O' outside position and gates are in the 'c' closed position. It would also be desirable to add a whole building blower (not shown), downstream of louvers 94 to enhance this protection.

46. During some intermediate weather conditions, indicated by the 'Spr/Fall' mode, thermal plane 24 could be used to increase heat in the building during the day. Heat acquired passing over pane 55 would add additional solar heat from the thermal pane moving through conduit 30 and be returned to the building with louvers 94 set to the 'I' inside flow setting. This mode of operation would also be advantageous to applications where drying of material or crops would occur, e.g. timber dehumidification or tobacco.

47. FIG. 7 is an additional process flow diagram that illustrates the operational modes discussed above along with some optional features that are pertinent to other applications e.g. free-standing arrays mounted in parking lots or on roof tops. Solar heat or night sky cooling capacity sourced from thermal plane 24 can be stored in tank 75, ideally buried beneath the parking lot.

48. In a free-standing array configuration building envelope 91 does not apply, nor does air flow 79 to inside the building. Louvers 94 are not necessary and all flows 47 emerge from plenum 78 as flow to the exterior 80. Plenum 78 in this case contains finned heat exchanger 92 having an inner tube 82 within an exterior tube 81 construction. Fins 83 are brazed to the outer tube. This type of exchanger is commonly used in greenhouses and is readily available.

49. Heat transfer fluid 93a is heated or cooled by conditioned air 47 that has passed through thermal conduit 30 and takes a path through exchanger 92 and around fins 83. Pump 75a circulates fluid 93a through tank 75 and exchanger 92 via transfer lines 93. Heat or cooling capacity is stored in thermal media 75b within the tank for use in nearby buildings, (not shown).

50. Cooling capacity is a critical component in the operation of computer server farms which are burgeoning across the world. The additional cooling capacity provided by the free-standing configuration would come at a lower cost than conventional air source heat pumps and would not disrupt the critical operations. Use of optional photovoltaic layers 136 on top of panels such as 33p and battery storage (not shown) would add to facility reliability in the event of ever more common power outages. Cooling and emergency power are also critical to operations of hospitals and other operations such as computer server farms, food services and sales.

51. FIGS. 8a through 8c show the structure and mounting of outer glazing 54 shown earlier. As fear of leakage around conventional daylighting curbs is a primary limitation on customer use, establishing a positive, reliable seal around the perimeter as illustrated in the figures is a requirement. FIG. 9 is an isometric assembly view of an alternate pane 55a to that described in earlier figures and a carrier frame 133 for both interior pane 55 and alternate pane 55a.

52. FIG. 8a is a top view of panel 32/FIG. 1 in the area of daylighting section 68. Compressed insulation 48 is shown filling the space between inside skin 66 of the panel and the outer skin in the compartment adjacent to section 68, (not numbered). Exterior glazing 54 is seen through exterior film 54d, which is laminated around the periphery of the lite to exterior surface 118. A preferred material for film 54d is Arkema 502-CUH-HC (or equivalent) which can be thermally or adhesively bonded to exterior surface 118 when panel 32 is produced at the factory. 502-CUH has a visible transmittance of 95% but absorbs significant amounts of UV light, reducing light aging of materials below it. Film 54d provides a reliable seal at the exterior of the roof deck. The lack of such a seal has been a major factor limiting the use of daylighting in buildings of all types.

53. Perimeter double line 112c is shown in FIG. 8b below as the bulb portion of flange 112 at bulkhead 52, (not shown to scale). FIG. 8b is an assembly drawing of joint 115 between glazing 54 and panel frame members. Flange 112 is basically half of earlier flange type 34/35 either made separately or cut from the earlier flanges. Soft gasket 113 is adhesively bonded to the bottom surface of flange 112 and compressed to form a secondary seal when rounded projection 54a of outer glazing 54 is pushed against it by plastic clip 129. Plastic clip 129 is nearly identical to earlier metal clip 96. Notch 129b in the clip is engaged from below by a flat hand tool and urged (arrow 114) into the space between angle 112b and ledge 54b of the glazing. Shallow notch 129 engages the square edge of angle 112b and the vertical edge of clip 129, (not numbered) engages the square edge of ledge 54b.

54. As shown in FIG. 8c, rounded projection 54a is thin compared to the overall thickness of glazing 54 and would likely fail in the completed assembly (as a chemical burst disk would on a pressure vessel) under the larger pressure differentials between the interior and exterior encountered in a hurricane or tornado. This would allow air flow 65 from below the daylighting section to vent air rapidly from inside and prevent uplift of the roof with subsequent failure of the building as a whole.

55. FIG. 8c is an edge view of glazing 54. Solar insolation 22 is shown at the right. After passing through the layers of glazing 54, the light emerges from textured surface 56c and is spread from its original linear beam to form a cone of light 121. Surface 56c is illustrated as pyramidal parts separated by planar parts as it may be desirable to have some view of the exterior while also diffusing the light to obtain fairly uniform illumination at floor level in the building. Film 54d in this view is shown parallel to the other parts and bonded to acrylic glazing sections 54e, 54a and 54b at surface 54f. During installation to surface 118 at the outside, flexible film 54d would be deformed to fit through the panel aperture defined by 112c and then bonded to surface 118.

56. The sections listed above are preferably formed by contouring the edges of a single piece of material. After contouring, the edge surfaces at the top of FIG. 8c are preferably polished to allow return of visible light occasionally piped out to the edges by the 'light pipe' effect between the lower refractive index 54d and the higher refractive index of the other sections.

57. FIG. 9 shows the use of a single pane 55a as an alternative to the double lite interior pane 55 used in the preceding drawings. The single pane unit would have reduced cost at some detriment to overall performance. Preferential IR reflection and refraction at the upper surface, indicated by 55c would be maintained. An optional alternative to placing diffusing surface 54c at glazing 54, diffusing surfaces could be placed below pane 55a as indicated by dashed arrow 55d.

58. In the final steps of field installation of system 100, either pane 55 or pane 55a is lowered onto carrier frame 131 and it is raised into position below the otherwise completed daylighting section 68. Hinge fittings 135 engage mating fittings at a structural component of section 68, and latch 32 is closed against a mating connector on the daylighting section to complete system 100.

59. The solar, daylighting and night cooling system 100 overcomes the inherent limitations of prior art systems in dealing with solving the key cooling load problem of lighting contribution to peak loads shown in FIGS. 10a and 10b. Additionally, it advances the field of daylighting beyond the approaches seen in the state of the art NY Times building in the area of enabling night sky cooling of buildings.

What is claimed is:

1. A solar, daylighting and night cooling system comprising:
   an array of elongated panels with each panel having a daylighting section at one or more places along its length, a continuous thermal plane of component materials at an upper side of said panels, except in the areas of said daylighting sections, a structural plane of component materials at a lower side of said panels and a group of insulating, fire retardant, and structural materials between said thermal plane and said structural plane,
   said thermal plane and said daylighting sections oriented to receive solar diffuse or beam insolation during the day and emit long wave radiation to the sky at night,
   with said panels joined edge to edge along their lengths to form said array with thermal conduit assembly means, said conduit assembly means in physical and thermal contact with said thermal plane and enclosing air passage channels,
   said air passage channels communicating with said daylighting sections and with a set of plenum means for directing an air flow in a building mounted array to either outside a building envelope, inside said building envelope or stopping said air flow from moving toward said plenum means,
   each of said conduit assembly means including a weatherstrip assembly at its upper side, angled elements of said conduit assembly means at corners thereof, a thermally insulating material at its lower side and said fire retardant and structural materials of said group at lateral sides of said conduit assembly means,
   with each said daylighting section having a central compartment with a transparent exterior glazing at said upper side of said panels and an interior pane with infrared light rejection and visible light transmission properties located roughly parallel to and spaced apart from said exterior glazing, said interior pane located in close proximity to the lower side of said panels, said daylighting section additionally having adjacent to said central compartment a first compartment with an open bottom communicating with an area below said array, said first compartment sealed at a top by said component materials of said thermal plane, and a second compartment adjacent to said central compartment having at least one blower connecting it to said central compartment on one side and a plurality of holes connecting said second compartment to said air passage channel at the other side, said second compartment housing a drying agent cartridge and having at least one actuated, nominally closed movable gate located at a bottom of said second compartment, said movable gate in an actuated position communicating with said area below said array, said second compartment having a separating wall between said central compartment on one side and a structural, insulating wall between it and said air passage channel on the other, said separating wall having said at least one blower mounted thereon, said solar and night cooling system additionally including control system means for:

starting and stopping said blowers to selectively draw said air flow from below said daylighting section, operating in a Summer Day mode with said air flow being heated above said interior pane by said solar insolation passing through said exterior glazing and expelling said air flow from said plenum means to the outside of said building envelope, operating in a Fire mode having the same actions as said Summer Day mode, operating in a Winter Day mode with said air flow being heated above said interior pane by said solar insolation passing through said exterior glazing and returning said air flow to below said panels by means of said at least one gate, operating in a Summer Night mode with said air flow passing into said conduit assembly, said air flow being cooled by means of said thermal plane and returning said air flow to the inside of said building envelope, operating in other modes configured for energy sourcing and conservation in said building mounted array.

2. The solar, daylighting and night cooling system of claim 1, wherein:

said central compartment is bounded by bulkheads at both ends, with at least one of said bulkheads carrying a module containing battery storage, controls electronics and power supplies, and a surface of said module facing away from said at least one bulkhead has a photovoltaic strip mounted on it which is electrically connected to said controls electronics and battery storage within said module, with said module having additional connections to said at least one blower, control connections to said actuated moveable gate and optionally having an additional power supply connection to a lighting strip optionally mounted within said first compartment.

3. The solar, daylighting and night cooling system of claim 1, wherein:

said interior pane is a double unit with two spaced apart lites separated by an insulating thermal gap and sealed around the perimeter or said unit, and said interior pane is mounted in a rectangular carrier frame having a hinged end and latch means at the other end for securing said pane at the bottom of said central compartment.

4. The solar, daylighting and night cooling system of claim 1, wherein:

said interior pane is a single unit with one infrared rejecting lite, and said interior pane is mounted in a rectangular carrier frame having a hinged end and latch means at the other end for securing said pane at the bottom of said central compartment.

5. The solar, daylighting and night cooling system of claim 1, wherein said plenum means for directing an air flow in the case of a building mounted array comprises:

a plenum shaped to receive said air flows from said air passage channels, said plenum having:

an interior surface for containing said air flows, a louver or louver setting for stopping said air flow from leaving said plenum, a louver or louver setting for directing said air flow to the outside of said building and a louver or louver setting for directing said air flow to the inside of said building, optionally said plenum can also house a finned tube heat exchanger inside said interior surface connected to a thermal storage tank.

6. The solar, daylighting and night cooling system of claim 1, wherein:

said drying agent cartridge contains a packed bed of drying agent material, with said drying agent material having the characteristic of releasing moisture to a flow of hot air and the characteristic of absorbing moisture from a flow of cooler air.

7. The solar, daylighting and night cooling system of claim 1, wherein:

said thermal plane comprises exterior metal flange portions of two structural side rails at the edges of said panels, metal cross braces anchored to interior channels of said flange portions connecting said structural side rails to one another, and an exterior metal skin layer bonded to top flanges of said flange portions, said skin layer spanning the width of said panels and optionally having an exterior surface coating with high emissivity properties applied to said skin layer at the tipper side of said panels, with said structural plane comprising interior metal flange portions of said structural side rails at the edges of said panels, metal cross braces anchored to interior channels of said interior flange portions connecting said structural side rails to one another, and an interior skin layer bonded to the bottom surfaces of said interior flange portions that spans the width of said panels and has an interior decorative surface coating with good visible light reflectance.

8. The solar, daylighting and night cooling system of claim 7, wherein said group comprises:

compressed fiberglass insulation batting between said exterior and interior metal skin layers, in locations other than said daylighting sections, both of said structural side rails having a fire retardant, thermally insulating composite web portion between said exterior and said interior flange portions, and fire retardant, thermally insulating composite bulkhead assemblies located at two sides of each said daylighting section and at the ends of each of said panels.

9. The solar, daylighting and night cooling system of claim 7, wherein:

said exterior metal skin layer extends to the perimeter of said exterior glazing and is bonded to flange components around said exterior glazing, with said exterior glazing having a transparent film secured to a rigid body portion at the upper surface, said transparent film larger in width and length than the dimensions of said body portion, with said transparent film bonded in a band around its perimeter to said optional exterior surface coating of said exterior skin forming a weather proof joint between said daylighting section and said exterior metal skin.

10. The solar, daylighting and night cooling system of claim 9, wherein:

said body portion of said exterior glazing has a roughly rectangular shape with an edge feature of a rounded projection extending beyond two adjacent ledge portions, with the material of one said ledge portion bonded to said transparent film and an interior face of the other said ledge portion directed toward said central compartment, said interior face optionally having textured, light diffusing contours on it, and said rounded projection engaging said flange components around said exterior glazing and locked in place forming a secondary seal using plastic clips that are wedged between angle portions of said flange components and the lower surface of said rounded projection.

11. The solar, daylighting and night cooling system of claim 10, wherein:

the material composition and thickness of said rounded projection allow it to be frangible under high differential pressures that might occur in severe storms, whereby, rapid release of pressure from within said building can significantly reduce uplift forces on said building mounted array.

12. The solar, daylighting and night cooling system of claim 7, wherein said weatherstrip assembly comprises:

an metal top plate secured in dovetail shaped channels of said exterior flange portions using metal clips located between the lower surface of said top plate and angle portions of said dovetail shaped channels, periodically spaced metal brackets that are fastened to said top plate and limit displacement of said clips from their positions, an elastomeric weatherstrip seal bonded to the upper, outside surface of said top plate, said weatherstrip seal having a flap portion at one side which overlaps one of said flanges to form a secondary seal and a width wise flat portion which is compressed between bulb portions of said top flanges and said metal top plate to form two primary seal lines at the edges of said weatherstrip assembly.

13. The solar, daylighting and night cooling system of claim 12, wherein:

said elements of said thermal plane include back sections of said dovetail shaped channels perpendicular to said top flanges, said back sections joining said top flanges with internal radii and continuing into said angle portions, said angle portions forming the upper corners of said thermal conduit assembly means, with said metal top plate having bulb portions congruent to and in close contact with said interior radii of said dovetail shaped channels, whereby, the additional cross sectional area provided by said internal radii, said close contact with said interior radii and said clips secured at said lower surface of said top plate create a path of least resistance for heat flows arising from said thermal plane to reach said thermal conduit assembly means.

14. The solar, daylighting and night cooling system of claim 13, wherein said thermal conduit assembly means further include:

thermal caulk applied between said top plate and said angle portions of said dovetail shaped channels.

\* \* \* \* \*